J. O. DREWS.
NUT CRACKING MACHINE.
APPLICATION FILED JULY 7, 1919.
1,379,540.
Patented May 24, 1921.
2 SHEETS—SHEET 1.
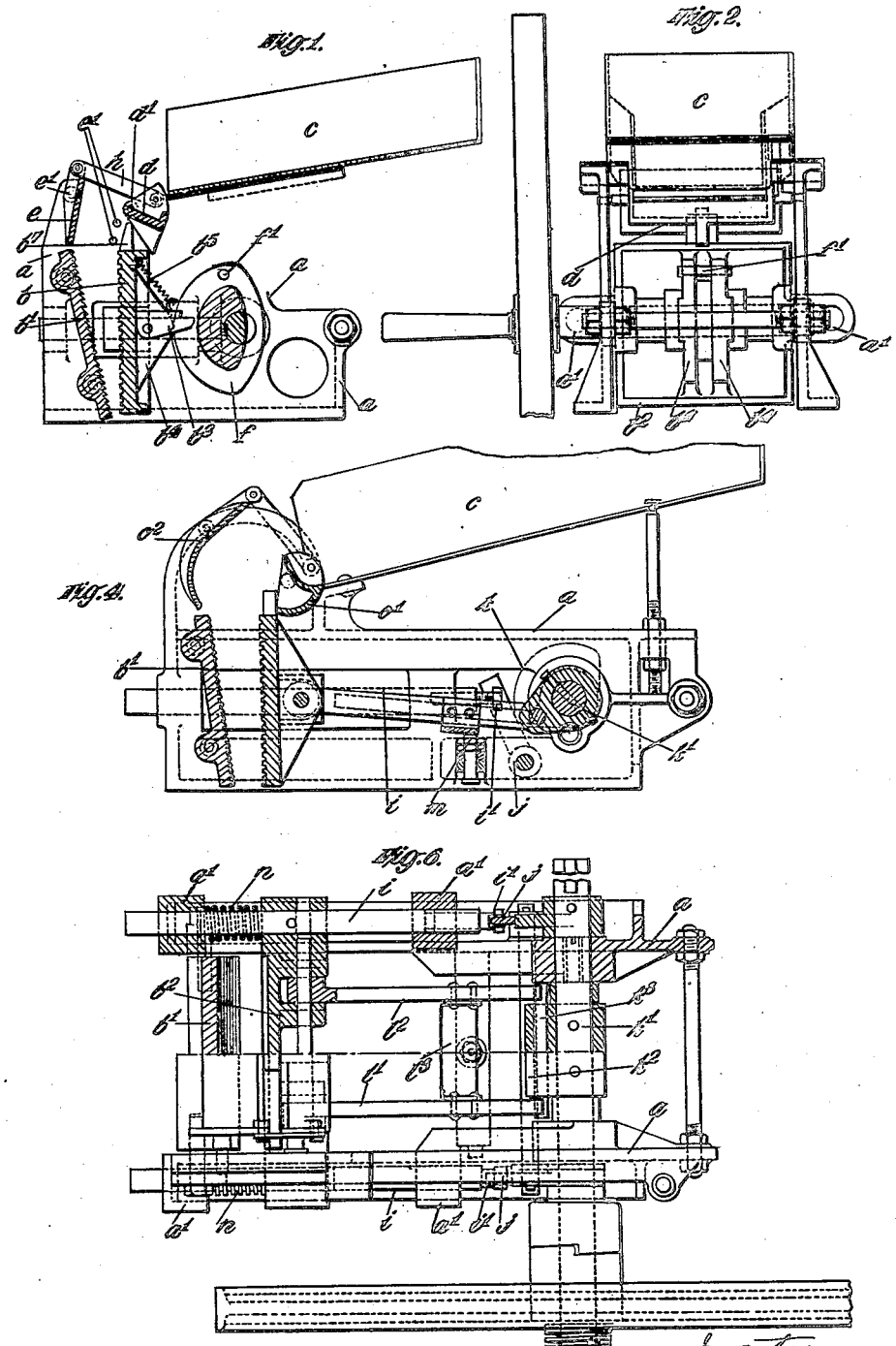

J. O. DREWS.
NUT CRACKING MACHINE.
APPLICATION FILED JULY 7, 1919.
1,379,540.
Patented May 24, 1921.
2 SHEETS—SHEET 2.
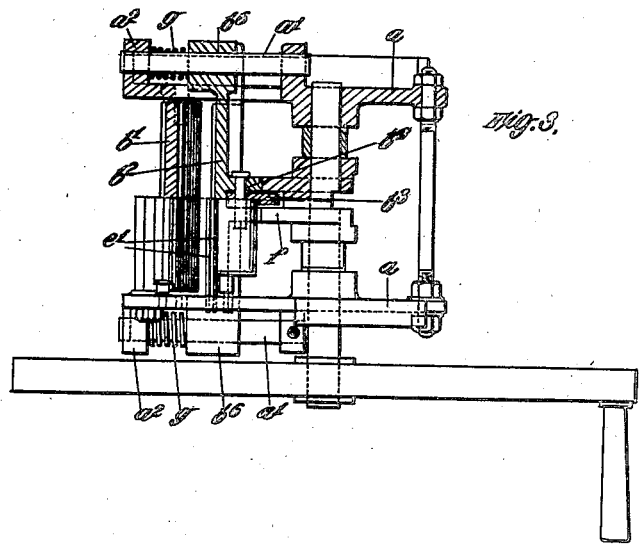
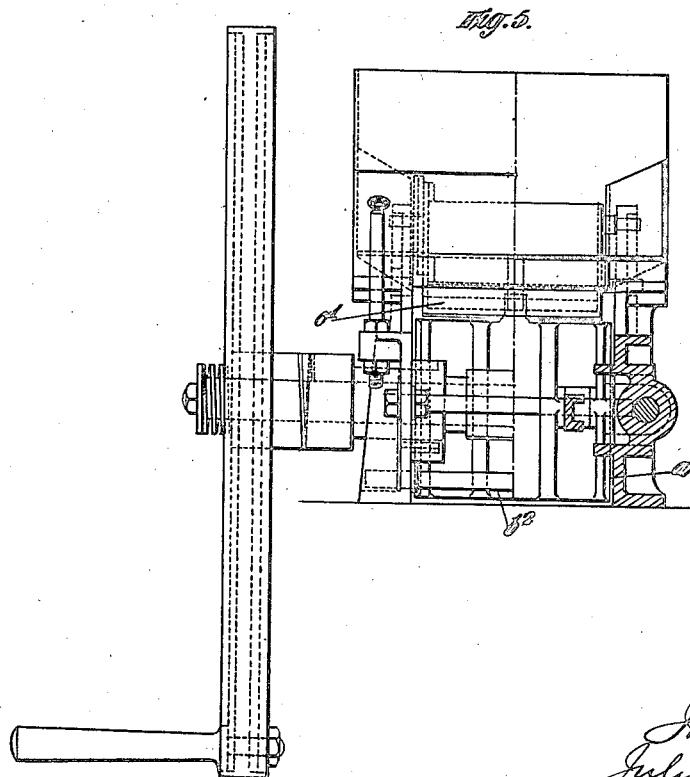

UNITED STATES PATENT OFFICE.

JULIUS OSCAR DREWS, OF LONDON, ENGLAND.

NUT-CRACKING MACHINE.

1,379,540.

Specification of Letters Patent.   Patented May 24, 1921.

Application filed July 7, 1919. Serial No. 309,044.

*To all whom it may concern:*

Be it known that I, JULIUS OSCAR DREWS, residing at 62 London Wall, E. C., in the city of London, England, have invented certain new and useful Improvements in or Relating to Nut-Cracking Machines, of which the following is a specification.

This invention relates to nut cracking machines of the kind set forth in the specification of British Letters Patent No. 23936 A. D. 1910, granted to J. O. Drews, in which the treatment of the nuts between two jaws inclined to one another is effected by causing the movable jaw to perform the cracking operation by moving bodily toward the stationary jaw from a position that provides a space for the reception and retention of the nuts between the jaws, and by then causing the said movable jaw to recede sufficiently to allow the cracked nuts to fall away from between the jaws thus separated, before returning the said jaw to its receiving position ready for treating a fresh supply of nuts.

According to the invention the movable jaw is mounted to slide on guides on the frame of the machine and actuated by a cam or cams adapted to impart an accelerated or impulsive movement to the jaw during its forward movement for the purpose of effecting the cracking of the shells of the nuts. Said movable jaw is also provided with means for controlling or regulating the supply of nuts passing from the feed hopper to the jaws.

In order that the invention may be clearly understood and readily carried into effect the same will now be more fully described by the aid of the accompanying drawings in which:—

Figure 1 is a vertical section of the nut cracking machine.

Fig. 2 is an end elevation of Fig. 1.

Fig. 3 is a horizontal section with the hopper or tray removed.

Fig. 4 is a vertical section of a machine modified for the purpose of treating larger nuts.

Fig. 5 is a half sectional end elevation of Fig. 3.

Fig. 6 is a horizontal section of Fig. 3.

$a$ is the frame, $b'$, $b^2$ the fixed and movable jaws respectively and $c$ the hopper or chute from which the nuts are fed to the jaws $b'$, $b^2$. Interposed between the hopper and the jaws are two deflecting members $d$, $e$ controlled by the movement of the jaw $b^2$ for regulating the supply of nuts to the jaws $b'$, $b^2$.

Referring to Figs. 1 to 3 a pivoted member $b^3$ is mounted between fixed lugs $b^4$ on the jaw $b^2$ which lugs engage with a bifurcated cam $f$ at the rear of the jaw. The member $b^3$ projects into the fork of the cam $f$ and is engaged during each revolution of the cam by a pin or stud $f'$ to impart a sudden impulse to the jaw, near the end of its forward stroke. A spring $b^5$ serves to return the member $b^3$ to its normal position and to allow the stud $f'$ to pass. The jaw $b^2$, after its release by the cam $f$, is returned by springs $g$ mounted on guide rods $a'$, Figs. 2 and 3, and disposed between lugs $b^6$ on the jaws $b^2$ and lugs $a^2$ on the frame. While preferring the jaw to be slidably mounted on said guide rods the rods may be adapted to slide in bearings in the framework of the machine. The jaw $b^2$ is also provided with a projection $b^7$ at its upper end which engages with the nut collecting channel or receiver $d$ mounted beneath the hopper $c$, the arrangement being such that as the cracked nuts fall away from the jaws $b'$, $b^2$ the receiver $d$ is operated to furnish a fresh supply. The receiver $d$ pivoted to the frame $a$ at $d'$ is connected by link or links $h$ to the shield or deflector $e$ which is pivoted to the frame at $e'$ and operated to receive the nuts passing from the receiver $d$ prior to their falling between the jaws $b'$, $b^2$, the operation being such that the nuts shall be permitted to get clear of the jaws prior to the uncracked nuts being fed thereto. The shield or deflector $e$ which also serves to prevent the nuts passing over the top of the fixed jaw $b'$ is arrested by the bars or stops $e'$ which cause the deflector $e$ to form a trough for receiving the nuts. Referring now to Figs. 4 to 6 the principle of operation is the same as in Figs. 1 to 3, but in order to permit of larger nuts or those having harder shells being cracked the arrangement of the mechanism is slightly varied. Thus the jaw $b^2$ instead of sliding on guide rods is connected to rods $i$, $i$ which slide in bearings $a^6$ of the frame $a$ which rods are acted upon by the levers $j$, $j$ interposed between the ends of the rods and the cams $k$, $k$ mounted on the driving shaft $k'$. The ends of the rods $i$, $i$ are provided with screwed bolts or studs $i''$, $i''$ for adjusting the movement or throw of the jaw $b^2$ and are slotted to receive the levers $j, j$. Or, the ends of the rods $i, i$ may be slotted to receive the levers $j, j$ so that when the latter are in position lock nuts may be screwed on to the threaded ends of the rods $i, i$ to hold the levers. On the shaft $k'$ is a member $k^2$ provided with a pin $k^3$ which extends to each side of the member $k^2$ to engage the rearwardly extending members $l'$, $l^2$ connected together by the cross-piece $l^3$ and pivoted at the other extremities to the movable jaw $b^2$. The operation of the pin $k^3$ on the members $l'$, $l^2$ is similar to that of the stud $f'$ on the member $b^3$ in Figs. 1 to 3 in that an impulse is imparted to the jaw $b^2$ once during each revolution. The downward movement of the members $l'$, $l^2$ under the action of the pin $k^3$ is limited by a stop $m$ fixed beneath the cross-piece $l^3$ while the return of the jaw $b^2$ is effected by the springs $n, n$ see Fig. 5.

The arrangement of nut receiver and shield or deflector shown at $o'$, $o^2$ respectively is operated and controlled in a similar manner to that shown in Figs. 1 to 3.

What I claim and desire to secure by Letters Patent of the United States is:—

1. A nut cracking machine, comprising a frame, an inclined feed chute, a fixed jaw, a sliding jaw, a plurality of pivoted deflectors mounted between the chute and the jaws for receiving nuts from the chute and delivering them between the jaws, and means carried by said sliding jaw for operating said deflectors.

2. A nut cracking machine comprising a frame, a feed chute, a fixed jaw, a movable jaw, means for receiving nuts from the chute and delivering them periodically between the jaws, cam mechanism for actuating the movable jaw, and means for imparting an impulsive movement to the movable jaw consisting of a spring controlled pivotal member adapted to be operated during each revolution of the actuating cam mechanism.

JULIUS OSCAR DREWS.